United States Patent [19]

Vlasov et al.

[11] 4,020,887

[45] May 3, 1977

[54] TIRES REINFORCED WITH STEEL CORD

[76] Inventors: Nikolai Nikiforovich Vlasov, ulitsa Malysheva 85, kv. 41, Sverdlovsk; Viktor Andreevich Golomazov, ulitsa Lenina, 64, kv. 8, Beloretsk; Nikolai Fedorovich Dubrov, ulitsa Lenina, 5, kv. 55, Sverdlovsk; Leonid Petrovich Zharkov, ulitsa Vasilia Kosorotova, 14, Beloretsk; Vladimir Alexandrovich Karavai, ulitsa Tochisskogo, 11, kv. 18, Beloretsk; Vitaly Kuzmich Likhov, ulitsa Karla Marxa, 53, kv. 54, Beloretsk; Ivan Nikolaevich Petukhov, ulitsa Malakhitovaya, 14, kv. 66, Moscow; Kuart Mikhailovich Petrov, ulitsa Pervomaiskaya, 82, kv. 44, Sverdlovsk; Leonid Dmitrievich Rolschikov, ulitsa Pushkina, 68, kv. 45, Beloretsk; Alexei Ivanovich Saveliev, ulitsa Karla Marxa, 56, kv. 31, Beloretsk; Nikolai Vasilievich Sokolov, ulitsa Lenina, 64, kv. 12, Beloretsk; Mikhail Petrovich Khlestkin, ulitsa Metallurgicheskaya, 113, Beloretsk, all of U.S.S.R.; Karl Borisovich Khusnoyarov, deceased, late of Sverdlovsk, U.S.S.R.; by Evdokia Mikhailovna Lenkova, administrator; by Nina Karlovna Lenkova, administrator, ulitsa Malysheva, 85, kv. 45, Sverdlovsk, U.S.S.R.

[22] Filed: June 16, 1976

[21] Appl. No.: 696,828

Related U.S. Application Data

[62] Division of Ser. No. 577,467, May 14, 1975, Pat. No. 3,984,238.

[52] U.S. Cl. .......................... 152/359; 75/123 K; 75/123 R
[51] Int. Cl.$^2$ ........................................... B60C 9/14
[58] Field of Search ......... 75/123 E, 123 K, 123 R, 75/125, 128 E, 128 B, 128 G, 128 H; 148/36; 152/198, 359

[56] References Cited

UNITED STATES PATENTS

| 2,631,096 | 3/1953 | Brown | 75/123 K |
| 2,950,187 | 8/1960 | Ototani | 75/123 K |
| 3,634,074 | 1/1972 | Ito et al. | 75/126 G |
| 3,652,267 | 3/1972 | Ito et al. | 75/123 R |

*Primary Examiner* — Arthur J. Steiner

[57] ABSTRACT

Vehicle tires reinforced with metal cord, the metal being steel which has been treated in a ladle with a slag-forming mixture and inert gas, and the steel consisting essentially of the following elements in weight percent:

C = 0.65-0.85,
Si = 0.20-0.37,
Mn = 0.30-0.70,
Co = 0.001-0.005,
Ca = 0.001-0.005 the balance being Fe.

2 Claims, No Drawings

TIRES REINFORCED WITH STEEL CORD

This is a divisional of application Ser. No. 577,467 filed May 14, 1975, now U.S. Pat. No. 3,984,238.

BACKGROUND OF THE INVENTION

The present invention relates to metallurgy and more specifically to tires having metal cord steel for reinforcing such tires for ground wheels of motor vehicles and aircraft.

Metal cord as rubber reinforcing material has gained wide application in many countries due to its higher strength, thermal stability and higher rigidity as compared with other materials used for the same purpose (glass-fiber cord, etc). Metal cord is actually a fabric reinforced with steel wire.

Widely known are steels for metal cord, comprising the following elements (in weight percent) as their main components: C 0.65–0.80, Mn 0.30–0.90, Si 0.15–0.40, P ≤ 0.040, S<0.040, and also Cr, Ni, Cu 0–0.10 (each).

Also known is the method of treating steels in the ladle by slag-forming mixture, with blowing them by inert gas for their purification of non-metal inclusions.

Quality of metal cord is determined principally by the properties of steel used for its manufacture - durability, strength and consistency of these properties.

Metal cord produced of known steels possesses insufficiently high flexural stability and fatigue strength, thus revealing one of the causes of rupturing metal cord failure in tires and premature ruining of tires.

OBJECT AND SUMMARY OF THE INVENTION

The object of the present invention is to provide tires with metal cord, which by possessing high mechanical properties would give the metal cord with high flexural stability and fatigue strength to prolong the service life of the tires reinforced with this metal cord.

This and other objects are achieved due to the provision of steel for metal cord, treated in the ladle by slag-forming mixture and inert gas and containing (in weight percent):
 carbon 0.65–0.85,
 silicon 0.2–0.37,
 manganese 0.3–0.7,
 cobalt 0.001–0.005,
 calcium 0.001–0.005 and
 ferrum — the balance.

The metal cord steel may also comprise (in weight percent): phosphor up to 0.015, sulphur up to 0.015, chromium up to 0.05, nickel up to 0.05, copper up to 0.05, oxygen up to 0.0035 and nitrogen up to 0.0035.

This steel will be best suitable for reinforcing various industrial rubber products and primarily tyres for ground wheels of motor vehicles and aircraft.

The essence of the present invention is in the following.

Liquid steel having the required chemical composition and temperature, when being poured from a melting furnace into a ladle, is given calcium and cobalt and this steel is simultaneously treated by slag-forming mixture and blown through by inert gas with the aid of a device incorporated in the ladle bottom lining.

With the introduction of the calcium into the steel, additional deoxidation of the latter takes place and spherically shaped inclusions are formed which are easily removed from it by treating steel with slag-forming mixture and inert gas. The larger part of the introduced calcium is spent for deoxidation of steel, while the remaining part is used for alloying the steel. Therefore, the steel contains calcium in small amounts (0.001–0.005 weight percent).

Cobalt contained in the steel in small amounts (0.001–0.005 weight percent) plays the role of alloying element and is instrumental in improving the fatigue strength of an steel.

The slag-forming mixture used in this process yields fluid-flowable slag possessing good adhesion to metal inclusions and increased desulphurization ability. The flow of steel pouring from the melting furnace into the ladle breaks a portion of the slag into drops which due to the intensive motion of the liquid steel caused by blowing the latter with inert gas, are first carried under, then come to the surface, thus purifying the steel from non-metal inclusions.

Blowing through the steel with inert gas is accompanied with equalization of its temperature, uniform distribution of the addition agents in the entire volume of the liquid steel and floatation of non-metal inclusions by gas bubbles.

Due to the above, the steel for metal cord according to the invention, as compared with known steel, possesses the following mechanical properties revealed in testing 0.15 mm diameter wire and metal cord produced thereof, which are given in Table 1.

Table 1

| Characteristic and measure unit | Known steel | | Novel steel | |
|---|---|---|---|---|
| mean carbon content, % | 0.76 | 0.68 | 0.75 | 0.68 |
| Ultimate strength of wire | | | | |
| N | 884 | 886 | 1090 | 1078 |
| X, kg/mm² | 266 | 277 | 274 | 279 |
| S, kg/mm² | 8.6 | 8.5 | 8.5 | 10.4 |
| Ultimate strength of wire with knot | | | | |
| N | 150 | 176 | 154 | 180 |
| X, % | 62.6 | 62.6 | 62.6 | 62.8 |
| S, % | 1.75 | 2.01 | 1.74 | 1.20 |
| Breaking load for whole metal cord, kg | | | | |
| N | 373 | 878 | 882 | 1288 |
| X | 93 | 96 | 93 | 98 |
| S | 1.28 | 1.43 | 1.41 | 1.67 |
| 1 | 2 | 3 | 4 | 5 |
| Durability of metal cord | | | | |
| N | 198 | 214 | 232 | 442 |
| X, thousand cycles | 11.8 | 11.0 | 17.2 | 13.3 |
| S, thousand cycles | 2.6 | 1.9 | 3.6 | 2.8 |

Table 1 includes the following symbols:
N - number of tests performed
X - arithmetic mean value
S - root-mean-square deviation The tabulated data indicate that the novel steel containing cobalt and calcium and treated with slag-forming mixture and inert gas is able to increase the durability of metal cord by up to 50% as against the known steel.

Metal cord was made from known steel and novel steel and this cord was used for reinforcing motor vehicle tires. These tires have been subjected to field tests which revealed that tires made with metal cord from the novel steel covered a 5% longer run than those made with metal cord from the unknown steel.

DETAILED DESCRIPTION OF PREFERRED EMBODIMENTS

In order to make the essence of the invention more readily understood the actual examples of its realization will now be described.

EXAMPLE 1

To prepared steel containing (in weight percent): carbon 0.75, manganese 0.45, silicon 0.25, oxygen 0.0029, nitrogen 0.0030, phosphorus 0.0012, sulphur 0.01, chromium 0.05, nickel 0.05, copper 0.05 and iron - the balance, was added cobalt and calcium each in the amount of 0.001 weight percent.

The obtained steel was treated in the ladle with a slag-forming mixture and inert gas by the method known in metallurgy. Then, by rolling and drawing, wire was produced from this steel which was used to manufacture metal cord, further tested for its properties. Mechanical properties of wire and metal cord manufactured therefrom are given in Table 2.

Table 2

| Characteristic | Measure unit | Mean value |
|---|---|---|
| Ultimate strength of wire | kgf/mm$^2$ | 274 |
| Ultimate strength of wire with knot | % | 62.6 |
| Breaking load for whole metal cord | kg | 93 |
| Durability of metal cord | thousand cycles | 17.0 |

EXAMPLE 2

To prepared steel containing (in weight percent): carbon 0.75, manganese 0.45, silicon 0.25, oxygen 0.0029, nitrogen 0.0030, phosphorus 0.0012, sulphur 0.01, chromium 0.05, nickel 0.05, copper 0.05 and iron - the balance, was added 0.005 weight percent of cobalt and 0.005 weight percent of calcium.

The obtained steel was treated in the ladle with slag-forming mixture and blown with inert gas by the method known in metallurgy.

Wire produced from this steel was used in manufacturing metal cord.

The results of the mechanical test of wire and metal cord are given in Table 3.

Table 3

| Characteristic | Measure unit | Mean value |
|---|---|---|
| Ultimate strength of wire | kgf/mm$^2$ | 275 |
| Ultimate strength of wire with knot | % | 62.8 |
| Breaking load for whole metal cord | kg | 94 |
| Durability of metal cord | thousand cycles | 17.1 |

EXAMPLE 3

To the steel composition indicated in Examples 1 and 2 uses added cobalt 0.0024 weight percent and calcium 0.002 weight percent. The balance was the same as in Examples 1 and 2. The results of the mechanical test of wire and metal cord are given in Table 4.

Table 4

| Characteristic | Measure unit | Mean value |
|---|---|---|
| Ultimate strength of wire | kgf/mm$^2$ | 274 |
| Ultimate strength of wire with knot | % | 62.6 |
| Breaking load for whole metal cord | kg | 93 |
| Durability of metal cord | thousand cycles | 17.0 |

As it is seen from the above description the metal cord manufactured from the novel steel, due to its high durability characteristic is an efficient material for reinforcing rubber tires for motor vehicles and aircraft and also for use in other industrial rubber products.

What we claim is:

1. Vehicle tires reinforced with metal cord, the metal of which is a steel which has been treated in a ladle with a slag-forming mixture and inert gas, and which consists essentially of the following elements in weight percent:
C = 0.65–0.85,
Si = 0.20–0.37,
Mn = 0.30–0170,
Co = 0.001–0.005,
Ca = 0.001–0.005,
the balance being Fe.

2. The vehicle tires as claimed in claim 1 wherein said metal further contains an effective amount of the following elements, in weight percent:
P up to 0.015,
S up to 0.015,
Cr up to 0.05,
Ni up to 0.05,
Cu up to 0.05,
O$_2$ up to 0.0035, and
N$_2$ up to 0.0035.

* * * * *